United States Patent [19]

O'Docherty et al.

[11] Patent Number: 5,518,266
[45] Date of Patent: May 21, 1996

[54] VEHICLE SAFETY APPARATUS INCLUDING INFLATABLE RESTRAINT

[75] Inventors: James K. O'Docherty, Gilbert; Kenneth D. Brannon; Hiroshi Nemoto, both of Mesa, all of Ariz.

[73] Assignee: TRW Inc., Lyndhurst, Ohio

[21] Appl. No.: 326,789

[22] Filed: Oct. 20, 1994

[51] Int. Cl.[6] .................................................. B60R 21/16
[52] U.S. Cl. .................................... 280/728.2; 280/743.1
[58] Field of Search ............................ 280/728.2, 731, 280/732, 743.1

[56] References Cited

U.S. PATENT DOCUMENTS

| | | | |
|---|---|---|---|
| 4,988,119 | 1/1991 | Hartmeyer | 280/728.2 |
| 4,989,897 | 2/1991 | Takada | 280/732 |
| 5,064,218 | 11/1991 | Hartmeyer | 280/731 |
| 5,176,400 | 1/1993 | McGuire et al. | 280/728.2 |
| 5,193,846 | 3/1993 | Allard | 280/728.2 |
| 5,195,774 | 3/1993 | Morita | 280/731 |

FOREIGN PATENT DOCUMENTS

| | | |
|---|---|---|
| 0542418 | 5/1993 | European Pat. Off. . |
| 9221534 | 12/1992 | WIPO . |

*Primary Examiner*—Kenneth R. Rice
*Attorney, Agent, or Firm*—Tarolli, Sundheim, Covell, Tummino & Szabo

[57] ABSTRACT

A vehicle safety apparatus (10) includes an air bag (16), a mounting plate (14) for mounting the air bag in the vehicle, and a retaining ring (18). The air bag (16) is clamped between the retaining ring (18) and the mounting plate (14). A recess (130) is formed on a first one of the retaining ring and the mounting plate (14). A projection (100) on a second one of the retaining ring (18) and the mounting plate (14) forces a portion of the air bag (16) into the recess (130) to resist movement of the air bag relative to the retaining ring and the mounting plate.

22 Claims, 7 Drawing Sheets

VEHICLE SAFETY APPARATUS INCLUDING INFLATABLE RESTRAINT

BACKGROUND OF THE INVENTION

1. Technical Field

The present invention relates to a vehicle safety apparatus including an inflatable vehicle occupant restraint, and particularly relates to a vehicle safety apparatus including means for maintaining an air bag in position relative to an air bag inflator.

2. Description of the Prior Art

It is known to protect a vehicle occupant by an air bag that is inflated in the event of sudden vehicle deceleration such as occurs in a vehicle collision. The air bag restrains movement of the vehicle occupant during the collision.

The air bag is inflated by inflation fluid from an air bag inflator. The air bag is typically held in position relative to the inflator by a retaining ring which clamps the air bag against a structure such as a mounting plate. A plurality of fasteners connect the retaining ring, the air bag, the inflator, and the mounting plate. Upon actuation of the inflator, the inflation fluid flowing into the air bag exerts a force on the air bag. This force tends to pull the air bag in a direction away from the inflator. The clamping force exerted by the fasteners and the retaining ring resists movement of the air bag away from the inflator.

The use of a large number of fasteners to secure an air bag in position is disadvantageous. The fasteners add a significant amount of weight to the assembly including the retaining ring, the air bag, the inflator, and the mounting plate. It may also be difficult to align a large number of fasteners with corresponding openings in the other parts. Thus, hand assembly of the fasteners may be necessary.

SUMMARY OF THE INVENTION

The present invention is an apparatus for restraining an occupant of a vehicle in the event of a vehicle collision, including an inflatable vehicle occupant restraint. The restraint has a folded and stored condition and an unfolded and inflated condition. An inflation fluid volume for receiving inflation fluid is defined by an interior surface of the restraint. The restraint has an exterior occupant engaging surface. The apparatus includes a mounting member for mounting the inflatable restraint in a vehicle, a retaining ring for engaging the inner surface of the restraint and for clamping the outer surface of the restraint against the mounting member, and means for securing the retaining ring to the mounting member with the restraint clamped between the retaining ring and the mounting member. The apparatus also includes surface means for defining a recess on a first one of the retaining ring and the mounting member, including a bottom wall of the first one of the retaining ring and the mounting member. The apparatus further includes means for forcing a first portion of the restraint into the recess and into engagement with the bottom wall of the recess, comprising a projecting member on a second one of the retaining ring and the mounting member. The projecting member clamps the outer surface of the restraint against the bottom wall of the first one of the retaining ring and the mounting member.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS OF THE INVENTION

Figure 1:
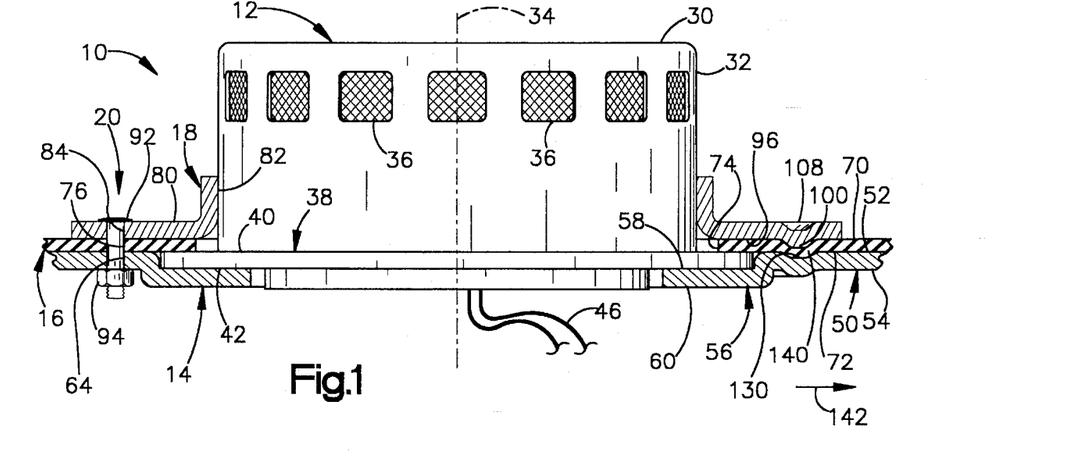
FIG. 1 is a transverse sectional view, with parts in elevation, of a vehicle safety apparatus in accordance with a first embodiment of the present invention and taken approximately along line 1—1 of FIG. 2.

The present invention relates to a vehicle safety apparatus including an inflatable restraint. The present invention is applicable to various vehicle safety apparatus constructions. As representative of the present invention, FIG. 1 illustrates a vehicle safety apparatus 10.

The vehicle safety apparatus 10 includes an inflator 12, a mounting member or mounting plate 14, an air bag 16, a retaining ring 18, and a plurality of fasteners 20. The inflator 12 is illustrated as a driver's side inflator and is a source of inflation fluid for inflating the air bag 16 to protect a driver of the vehicle during vehicle deceleration such as occurs during a collision. It should be understood that the present invention is applicable to vehicle safety apparatus including inflators having different configurations including inflators for passenger side air bags or for side impact air bags.

The inflator 12 includes a body portion 30 having a cylindrical outer side surface 32 which extends parallel to a central axis 34 of the vehicle safety apparatus 10. A plurality of gas outlet openings 36 are formed in the body portion 30 of the inflator 12 for directing inflation fluid into the air bag 16. A mounting flange 38 projects radially outward from a lower (as viewed in FIG. 1) end of the body portion 30 of the inflator 12. The mounting flange 38 has parallel radially extending upper and lower major side surfaces 40 and 42. A pair of lead wires 46 extend from the inflator 12 and are connected to vehicle circuitry (not shown) to receive an electric signal to actuate the inflator, in a known manner.

The mounting plate 14 is a member which secures the inflator 12, the air bag 16, and the retaining ring 18 to a portion of the vehicle (not shown) such as the vehicle steering wheel assembly. The mounting plate 14 is a metal plate. It should be understood that a mounting plate can have different configurations. For example, in a vehicle safety apparatus including a passenger side air bag, the mounting plate could be a portion of a housing of an air bag module, a portion of an inflator, or a portion of a vehicle instrument panel.

A body portion 50 of the mounting plate 14 has parallel radially extending upper and lower major side surfaces 52 and 54. An annular flange portion 56 of the mounting plate 14 is disposed radially inward of the body portion 50. The flange portion 56 has parallel radially extending upper and lower major side surfaces 58 and 60. Four circular openings 64, only one of which is visible in FIG. 1, extend axially through the body portion 50 of the mounting plate 14. The openings 64 are spaced 90° apart in a circular array centered on the axis 34.

The air bag 16 (FIG. 1) is made from a fabric material, such as woven nylon. The thickness of the air bag material is for clarity exaggerated in the drawings, and only a portion of the air bag 16 is illustrated in FIG. 1. The remaining portion (not shown) of the air bag 16 is folded and stored adjacent to the inflator 12, in a known manner. The portions of the air bag 16 and of the mounting plate 14 which project radially outward of the retaining ring 18 are not illustrated in FIG. 2.

The air bag 16 (FIGS. 1 and 3) has an interior surface 70 and an exterior surface 72. The interior surface 70 defines an inflation fluid volume for receiving inflation fluid from the inflator 12 to move the air bag 16 from the folded and stored condition to the inflated condition. When the air bag 16 is inflated, the exterior surface 72 is engageable by a vehicle occupant to restrain movement of the vehicle occupant.

The body portion 30 of the inflator 12 extends through a central opening 74 in the air bag 16. Four circular openings 76 in the air bag 16, only one of which is visible in FIG. 1, extend axially through the air bag. The openings 76 are spaced 90° apart in a circular array centered on the axis 34. The openings 76 in the air bag 16 overlie the openings 64 in the mounting plate 14.

The retaining ring 18 (FIGS. 1 and 3) is annular in shape and circumscribes the inflator 12. The retaining ring 18 is made from metal and has an L-shaped cross-sectional configuration including a generally planar radially extending body portion 80 and an axially extending flange portion 82. The flange portion 82 defines a central opening of the retaining ring 18 through which the body portion 30 of the inflator 12 extends. The flange portion 82 is in abutting engagement with the outer surface 32 of the body portion 30 of the inflator 12. Four circular openings 84, only one of which is visible in FIG. 1, extend axially through the body portion 80 of the retaining ring 18. The openings 84 are spaced 90° apart in a circular array centered on the axis 34. The openings 84 overlie the openings 76 in the air bag 16 and the openings 64 in the mounting plate 14.

Each fastener 20 (FIG. 1) includes a bolt 92 and a nut 94. The bolts 92 extend axially through the aligned openings 84, 76, and 64 in the retaining ring 18, the air bag 16, and the mounting plate 14, respectively. The nuts 94 are screwed on the bolts 92. It should be understood that the bolts 92 could be permanently joined, in a manner such as by welding, with the retaining ring 18. Also, other types of fasteners such as rivets could be used instead of the bolts 92 and the nuts 94.

When the nuts 94 are screwed on the bolts 92, the air bag 16 is clamped between the retaining ring 18 and the mounting plate 14. Specifically, the interior surface 70 of the air bag 16 is in abutting engagement with a lower major side surface 96 (FIG. 3) of the body portion 80 of the retaining ring 18. The exterior surface 72 of the air bag 16 is in abutting engagement with the upper major side surface 52 of the body portion 50 of the mounting plate 14.

The inflator 12 is also clamped between the retaining ring 18 and the mounting plate 14. The upper major side surface 40 of the mounting flange 38 of the inflator 12 is disposed adjacent to the lower major side surface 96 of the body portion 80 of the retaining ring 18. The material of the air bag 16 is disposed between the inflator mounting flange 38 and the retaining ring 18. The lower major side surface 42 of the mounting flange 38 of the inflator 12 is in abutting engagement with the upper major side surface 58 of the flange portion 56 of the mounting plate 14. The mounting flange 38 of the inflator 12 has a thickness approximately equal to the axial distance between the upper major side surface 52 of the main body portion 50 of the mounting plate 14 and the upper major side surface 58 of the flange portion 56 of the mounting plate. Accordingly, when the fasteners 20 clamp the air bag 16 between the retaining ring 18 and the mounting plate 14, the inflator 12 is also held in position between the retaining ring and the mounting plate.

Figure 2:
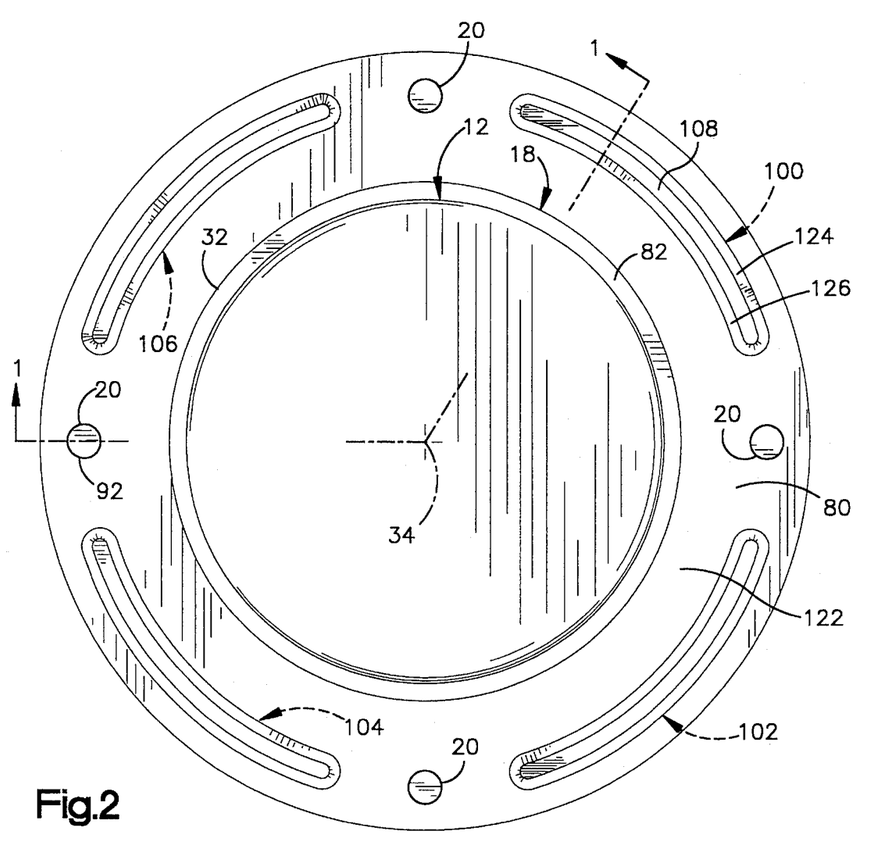
FIG. 2 is a plan view of the vehicle safety apparatus of FIG. 1.

At four locations around the retaining ring 18, the material of the otherwise planar body portion 80 of the retaining ring is displaced axially to form four identical projections 100, 102, 104, and 106. Each projection 100–106 is configured as an arc, extending less than 90°, of a circle centered on the axis 34. The projections 100–106 are of equal arcuate length and are equally spaced about the axis 34. Because the projections 100–106 are identical in configuration to each other, only the projection 100 will be described in detail.

The projection 100 is formed by displacing the material of the body portion 80 of the retaining ring 18 axially in a direction opposite to the direction in which the flange portion 82 of the retaining ring projects from the body portion of the retaining ring. The displacement of the material forms the arcuate projection 100 on the side of the retaining ring which is presented toward the mounting plate 14. On the opposite side of the retaining ring 18, the displacement of the material forms an arcuate groove 108.

The projection 100 (FIG. 3) has a radially extending bottom surface 110 which extends parallel to and is offset axially from the lower major side surface 96 of the body portion 80 (FIG. 3) of the retaining ring 18. Angled, radially outer and inner side surfaces 112 and 114 of the projection 100 extend between the bottom surface 110 and the lower major side surface 96 of the retaining ring 18.

The groove 108 (FIGS. 2 and 3) is complementary in configuration to the projection 100. The groove 108 is partially defined by a radially extending bottom surface 120 which extends parallel to and is offset axially from an upper major side surface 122 of the body portion 80 of the retaining ring 18. Angled, radially outer and inner side surfaces 124 and 126, which partially define the groove 108, extend between the bottom surface 120 of the groove 108 and the upper major side surface 122 of the retaining ring 18.

Figure 3:
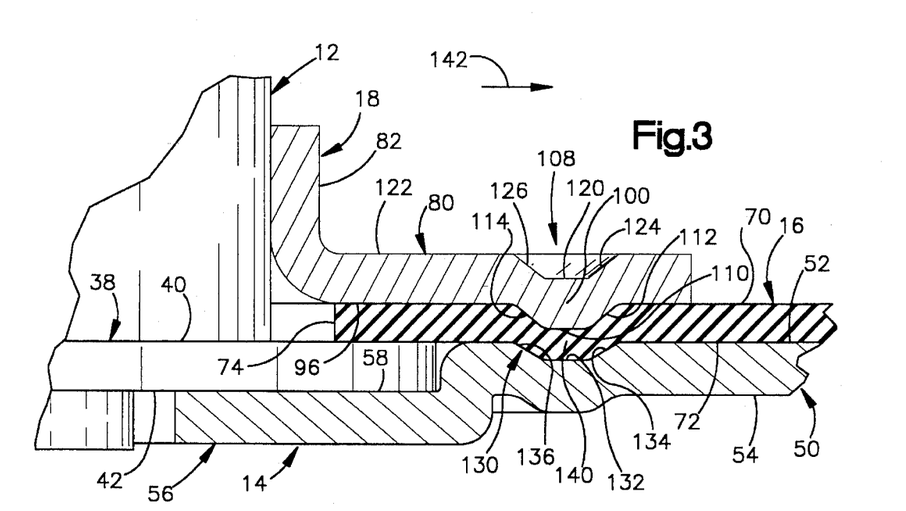
FIG. 3 is an enlarged view of a portion of the vehicle safety apparatus of FIG. 1.

Each one of the projections 100–106 on the retaining ring 18 overlies a corresponding arcuate recess on the mounting plate 14, one of which is shown at 130 (FIGS. 1 and 3). Four such recesses are formed in the mounting plate 14, identical to each other in configuration and equally spaced about the axis 34. Each recess 130 is in the form of a groove which extends circumferentially around a portion, less than 90°, of the inner circumference of the body portion 50 of the mounting plate 14. Each of the four recesses, including the recess 130, has an arcuate length approximately equal to the arcuate length of the projections 100–106. The recesses are concentric with the projections 100–106.

To form the four recesses, including the recess 130, the material of the body portion 50 of the mounting plate 14 is offset or displaced axially out of the plane of the mounting plate 14 and in a direction so as to extend away from the retaining ring 18. On the side of the mounting plate 14 which is presented toward the retaining ring 18, the displacement of the material of the mounting plate creates the four recesses, including the recess 130, in the form of arcuate grooves which are presented toward the retaining ring.

The recess 130 (FIG. 3), as exemplary of the four recesses in the mounting plate 14, is partially defined by a radially extending bottom wall having a bottom surface 132 which extends parallel to and is offset axially from the upper major side surface 52 of the body portion 50 of the mounting plate 14. Angled, radially outer and inner side surfaces 134 and 136, which partially define the recess 130, extend between the upper major side surface 52 of the mounting plate 14 and the bottom surface 132. The radially outer side surface 134 extends generally parallel to the radially outer side surface 112 of the projection 100. The radially inner side surface 136 extends generally parallel to the radially inner side surface 114 of the projection 100 on the retaining ring 18.

When the air bag 16 is clamped between the retaining ring 18 and the mounting plate 14, a portion 140 (FIG. 3) of the material of the air bag is forced by the projection 100 into the recess 130. The surfaces on the projection 100 cooperate with the surfaces defining the recess 130 to resist movement of the air bag 16, including the portion 140, in a radially outward direction as indicated by the arrow 142 in FIG. 3. Thus, the surfaces 110, 112 and 114 on the projection 100 are in abutting engagement with the interior surface 70 of the portion 140 of the air bag 116 which is forced by the projection 100 into the recess 130. These surfaces 110, 112, and 114, especially the radially inner side surface 114, resist movement of the air bag 16 in the direction 142. The surfaces 132, 134 and 136, which define the recess 130 in the mounting plate 14, are in abutting engagement with the exterior surface 72 of the air bag 16. These surfaces 132, 134 and 136, especially the radially outer side surface 134, resist movement of the air bag portion 140 in the direction 142. The projection 100 clamps the exterior surface 72 of the air bag 16 against the bottom surface 132 of the bottom wall of the mounting plate 14. As a result, to move the material of the air bag 16 through the gap between the projection 100 and the groove 130 requires substantially more energy than would be required to move the material through a gap between opposed parallel planar surfaces.

In a similar manner, the other three projections 102, 104 and 106 on the retaining ring 18 force portions of the material of the air bag 16 into their corresponding recesses (not shown) in the mounting plate 14. Thus, the projections 102, 104 and 106 cooperate with the recesses in the mounting plate 14 to resist movement of the air bag 16 relative to the retaining ring 18 and to the mounting plate during inflation of the air bag.

It should be understood that the dimensions of the projections 100–106 and of the recesses in the mounting plate 14, including the recess 130, may be selected so that the projections extend into the recesses. Also, the distance between the bottom surface of each projection 100–106 on the retaining ring 18 and the bottom surface of its corresponding recess on the mounting plate 14 may be selected to be less than the distance between other portions of the retaining ring and the mounting plate. For example, the distance between the bottom surface 110 of the projection 100 on the retaining ring 18 and the bottom surface 132 of the groove 130 on the mounting plate 14 may be less than the distance between the lower major side surface 96 of the body portion 80 of the retaining ring and the upper major side surface 52 of the body portion 50 of the mounting plate. This decreased distance between the projection and the recess can increase the clamping effect on the material of the air bag 16.

Figure 4:
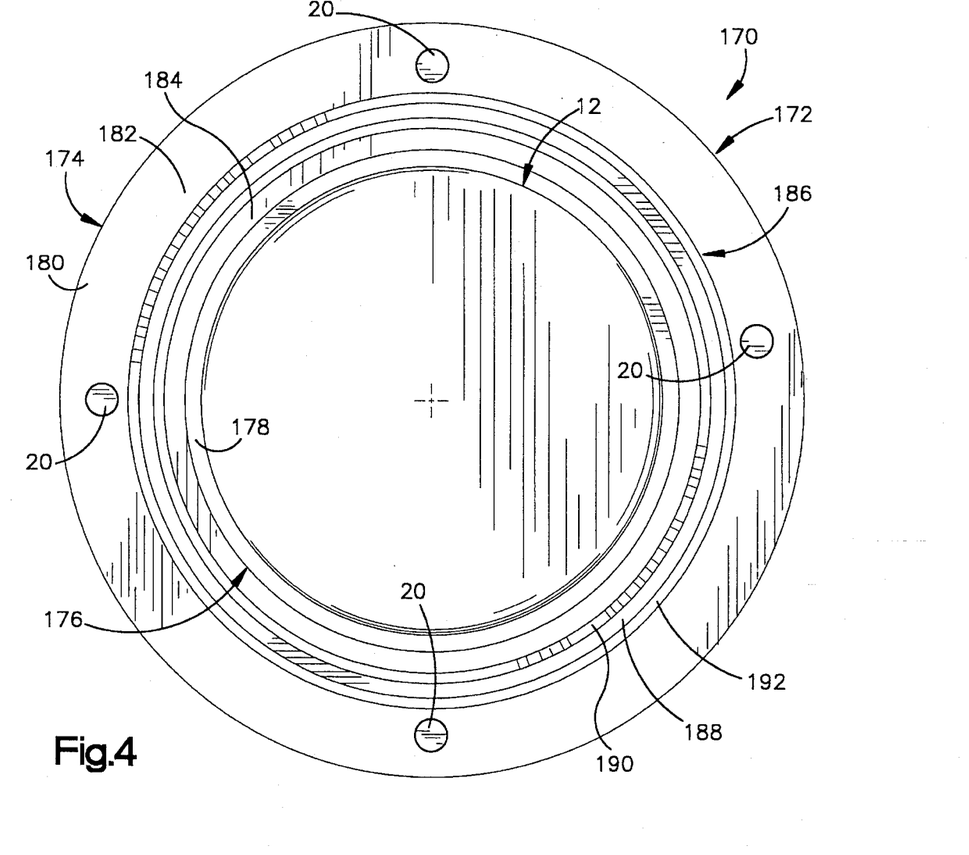
FIG. 4 is a plan view of a vehicle safety apparatus in accordance with a second embodiment of the present invention.

It should also be understood that more than four or fewer than four sets of projections and recesses can be provided. Further, the projections and recesses can have arcuate lengths other than that shown in FIG. 2. As an example, FIG. 4 illustrates a vehicle safety apparatus 170 which is constructed in accordance with a second embodiment of the present invention. In FIG. 4, parts which are the same as those illustrated in FIGS. 1–3 are given the same reference numerals. The vehicle safety apparatus 170 includes an inflator 12. A retaining ring 172 cooperates with a plurality of fasteners 20 to secure the inflator 12 and an air bag (not shown) to a mounting plate (not shown).

The retaining ring 172 is similar in configuration to the retaining ring 18 (FIGS. 1–3). The retaining ring 172 is generally L-shaped in cross-sectional configuration including a body portion 174 and a flange portion 176. The flange portion 176 has an annular radially extending upper major side surface 178.

The body portion 174 of the retaining ring 172 has a planar upper major side surface 180 which is divided into annular outer and inner portions 182 and 184 by a 360° circumferential groove 186. The groove 186 has the same cross-sectional configuration as the groove 108 (FIGS. 1–3) in the retaining ring 18. The groove 186 has a bottom surface 188 and angled radially inner and outer surfaces 190 and 192. The groove 186 extends 360° around the periphery of the retaining ring 172 in a circular configuration centered on the central axis of the vehicle safety apparatus 170.

The groove 186 is formed by displacing material of the body portion 174 of the retaining ring 172 in an axial direction into the paper as viewed in FIG. 4. This displacement of material results in the formation of a 360° circular projection on the underside (not seen in FIG. 4) of the retaining ring 172 which is presented toward the mounting plate. The projection as thus formed has a cross-sectional configuration identical to the cross-sectional configuration of the projection 100 (FIG. 3). The projection overlies a 360° circumferential recess (not shown) in the mounting plate which has the same cross-sectional configuration as the recess 130 (FIG. 3). When the fasteners 20 clamp the retaining ring 172 together with the air bag and mounting plate (not shown), the 360° projection forces a portion of the material of the air bag into the 360° recess in the mounting plate to resist movement of the air bag relative to the retaining ring and the mounting plate.

Figure 5:
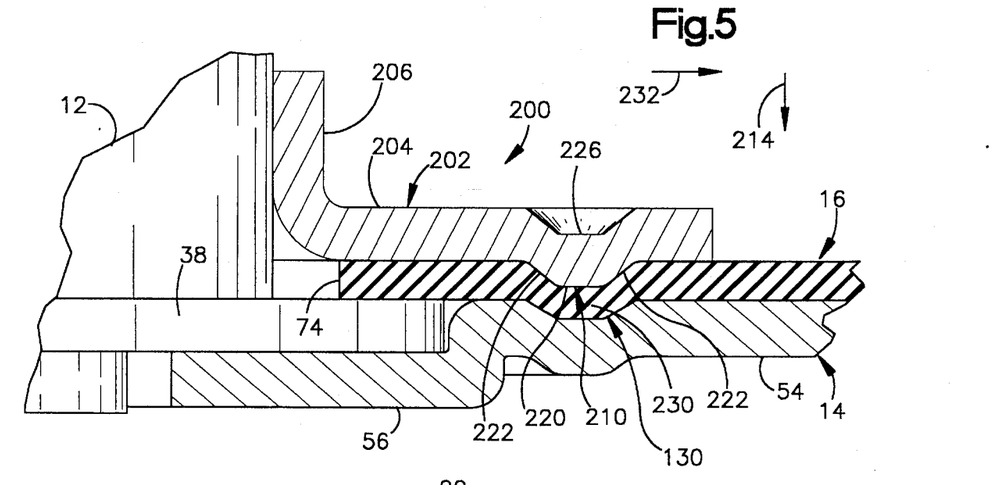
FIG. 5 is a view similar to FIG. 3 in accordance with a third embodiment of the present invention and taken approximately along line 5—5 of FIG. 6.
Figure 6:
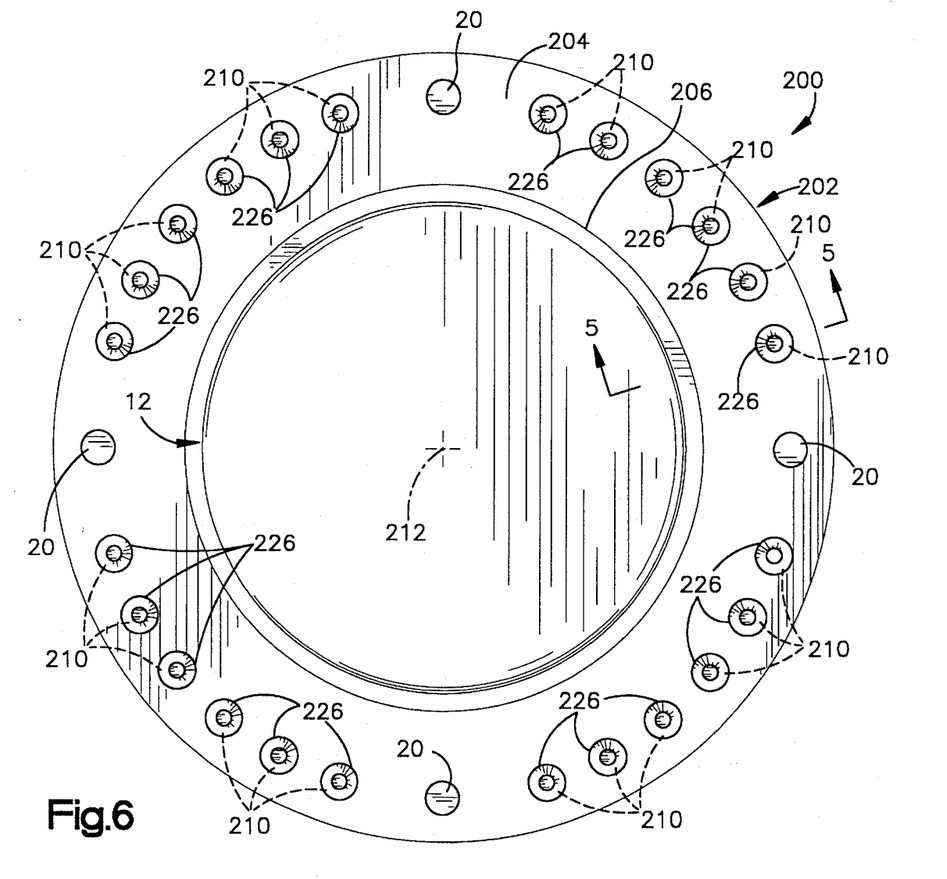
FIG. 6 is a plan view similar to FIG. 2 of the vehicle safety apparatus of FIG. 5.

It should be understood that cooperating projections and recesses of the embodiment of FIGS. 1–3 may have a configuration other than an arcuate configuration. As an example, FIGS. 5 and 6 illustrate a vehicle safety apparatus 200 which is constructed in accordance with a third embodiment of the present invention. Parts of the vehicle safety apparatus 200 which are the same as those illustrated in the vehicle safety apparatus 10 (FIGS. 1–3) are given the same reference numerals.

The vehicle safety apparatus 200 includes an air bag 16 and a mounting plate 14 (FIG. 5). The vehicle safety apparatus 200 also includes an inflator 12 and a retaining ring 202. The retaining ring 202 is similar in configuration to the retaining ring 18 (FIGS. 1–3). The retaining ring 202 is L-shaped in cross-sectional configuration and includes a generally flat radially extending body portion 204 and an axially extending flange portion 206. A plurality of fasteners 20 (FIG. 6) connect the inflator 12, the retaining ring 202, the air bag 16 and the mounting plate 14, in a manner as described above.

In place of the arcuate projections 100–106 (FIGS. 1–3) of the retaining ring 18, the retaining ring 202 includes a series of identical circular projections 210, one of which is shown in detail in FIG. 5. The projections 210 are grouped in arcuate segments about a central axis 212 (FIG. 6) of the vehicle safety apparatus 200. Each projection 210 is formed by displacing a small circular portion of the material of the body portion 204 of the retaining ring 202 axially in a direction as indicated by the arrow 214 in FIG. 5. Each projection 210 as thus formed has a radially extending bottom surface 220 and a frustoconical side surface 222. The displacement of the material of the retaining ring 202 to form the projections 210 creates a series of circular dimples or depressions 226 on the upper major side surface of the body portion 204 of the retaining ring 202.

The projections 210 on the retaining ring 202 overlie and as a group are concentric with the grooves 130 on the mounting plate 14. The projections 210 force portions of the material of the air bag 16, as indicated at 230, into the grooves 130 in the mounting plate 14. This displacement of the material of the air bag 16, between the projections 210 and the grooves 130, resists movement of the material of the air bag 16 radially outward in a direction as indicated by the arrow 232 (FIG. 5) upon inflation of the air bag.

Figure 7:
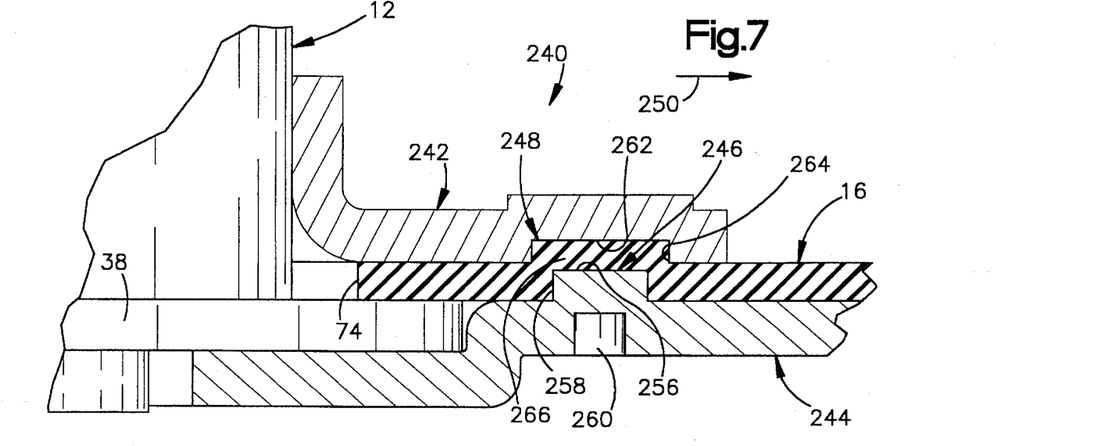
FIG. 7 is a sectional view similar to FIG. 5 in accordance with a fourth embodiment of the present invention.

As a further example of the types of projections and recesses which can be incorporated in a vehicle safety apparatus constructed in accordance with the invention, FIG. 7 illustrates a portion of a vehicle safety apparatus 240 constructed in accordance with a fourth embodiment of the present invention. Parts of the vehicle safety apparatus 240 which are the same as parts of the vehicle safety apparatus 10 (FIGS. 1–3) are given the same reference numerals. The vehicle safety apparatus 240 includes an inflator 12, an air bag 16, a retaining ring 242, and a mounting plate 244. The inflator 12 and the air bag 16 are clamped between the retaining ring 242 and the mounting plate 244. A plurality of fasteners (not shown), such as the fasteners 20 illustrated in FIGS. 1 and 2, connect the parts of the vehicle safety apparatus 240.

In the vehicle safety apparatus 240, one or more projections 246 are formed in the mounting plate 244, rather than in the retaining ring 242. The projections 246 cooperate with one or more recesses 248 formed in the retaining ring 242 to resist movement of the material of the air bag 16 in a radial direction, as indicated by the arrow 250, upon inflation of the air bag. The projections 246 may be individual circular projections such as the projections 210 (FIG. 5). The projections 246 may alternatively have a different configuration such as the arcuate or annular projections illustrated in FIGS. 2 and 4.

Each projection 246 is formed by displacing a portion of the material of the mounting plate 244 out of the plane of the mounting plate toward the retaining ring 242. Each projection 246 has a radially extending end surface 256 and a cylindrical, axially extending side surface 258. The end surface 256 extends at a 90° angle to the side surface 258. The displacement of the material of the mounting plate 244 to form the projections 246 creates a series of cylindrical depressions 260 in the surface of the mounting plate 244 presented away from the retaining ring 242.

Each recess 248 in the retaining ring 242 is defined by a circular end wall 262 and a cylindrical side wall 264 which extends at a 90° angle to the end wall 262. Each projection 246 forces a portion 266 of the air bag 16 into a corresponding recess 248 in the retaining ring 242. The cooperation between the projections 246 and the recesses 248 resists movement of the air bag 16 in the direction 250 during inflation of the air bag.

Figure 8:
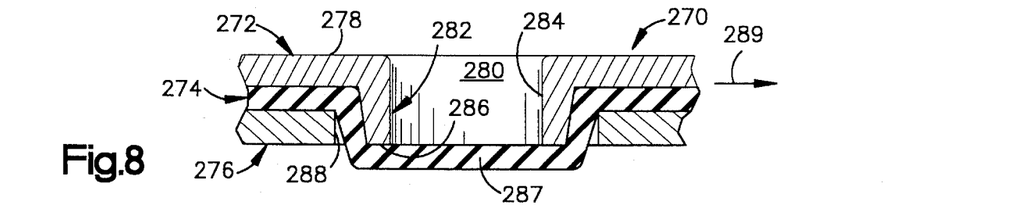
FIG. 8 is a view showing a portion of a vehicle safety apparatus constructed in accordance with a fifth embodiment of the present invention.

FIG. 8 illustrates a portion of a vehicle safety apparatus 270 which is constructed in accordance with a fifth embodiment of the present invention. The vehicle safety apparatus 270 includes a retaining ring 272, an air bag 274, and a mounting plate 276. Each of the retaining ring 272, the air bag 274, and the mounting plate 276 has an overall configuration such that it may be substituted in the vehicle safety apparatus 10 (FIGS. 1–3) for the retaining ring 18, the air bag 16, or the mounting plate 14, respectively.

The retaining ring 272 has a radially extending main body portion 278. A series of circular openings 280 extend axially through the main body portion 278 of the retaining ring 272. Each opening 280 is circumscribed by a respective annular flange 282 which projects axially from the main body portion 278 of the retaining ring 272 toward the mounting plate 276. Each flange 282 has a cylindrical, axially extending side wall 284 and an annular, radially extending end wall 286. Although the end wall 286 is illustrated as being smooth, it could also be roughened to grip the air bag 274.

A corresponding series of recesses 288 is formed in the mounting plate 276. The recesses 288 are in the form of openings which extend axially through the mounting plate 276. The flanges 282 of the retaining ring 272 overlie, in a one-to-one relationship, the openings 288 in the mounting plate 276. The air bag 274 is clamped between the retaining ring 272 and the mounting plate 276. The flanges 282 of the retaining ring 272 project into the openings 288 in the mounting plate 276 and force a portion 287 of the air bag 274 into the openings 288. The cooperating flanges 282 and openings 288 resist movement of the air bag 274 in a radial direction as indicated by the arrow 289 upon inflation of the air bag.

Figure 9:
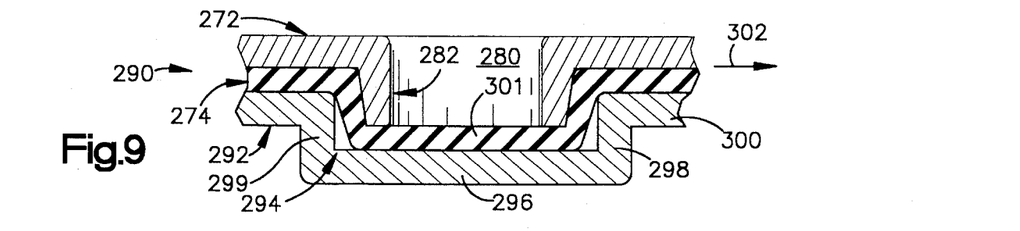
FIG. 9 is a view similar to FIG. 8 showing a portion of a vehicle safety apparatus constructed in accordance with a sixth embodiment of the present invention.

FIG. 9 illustrates a portion of a vehicle safety apparatus 290 which is constructed in accordance with a sixth embodiment of the present invention. The vehicle safety apparatus 290 includes a retaining ring 272 which is identical to the retaining ring illustrated in FIG. 8, and an air bag 274 which is identical to the air bag illustrated in FIG. 8. A mounting plate 292 (FIG. 9), rather than having a series of discrete openings as does the mounting plate 276, has a single continuous recess 294 which extends in a 360° circular configuration around the central axis (not shown) of the vehicle safety apparatus 290. The recess 294 is defined by a circular, radially extending end wall 296 and cylindrical side walls 298 and 299 which projects axially from a main body portion 300 of the mounting plate 292.

The flanged openings 280 in the retaining ring 272 overlie the recess 294 in the mounting plate 292. The air bag 274 is clamped between the retaining ring 272 and the mounting plate 292 by suitable fasteners (not shown). The flanges 282 on the retaining ring 272 force a portion 301 of the air bag 274 into the recess 294 of the mounting plate 292. Movement of the air bag 274 in a radial direction as indicated by the arrow 302, through the gaps between the flanges 282 and the recess 294, is thus resisted upon inflation of the air bag.

Figure 10:
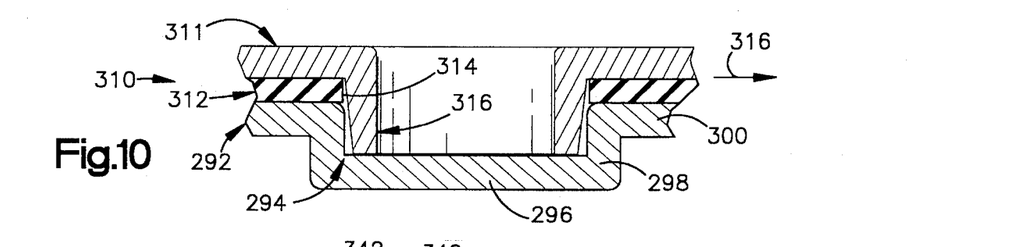
FIG. 10 is a view similar to FIG. 8 showing a portion of a vehicle safety apparatus constructed in accordance with a seventh embodiment of the present invention.

FIG. 10 illustrates a portion of a vehicle safety apparatus 310 which is constructed in accordance with a seventh embodiment of the present invention. The vehicle safety apparatus 310 includes a retaining ring 311 and a mounting plate 292. The vehicle safety apparatus 310 also includes an air bag 312 in which a circular opening 314 is formed. A circular, axially extending flange 316 of the retaining ring 311 extends through the opening 314 in the air bag 312 and is received in the recess 294 of the mounting plate 292. The retaining ring 311 cooperates with the mounting plate 292 to resist movement of the air bag 312 in a radial direction as indicated by the arrow 316 upon inflation of the air bag. Any desired number of sets of the flanges 316, openings 314, and recesses 294, can be provided. These sets can be arranged in any desired configuration.

Figure 11:
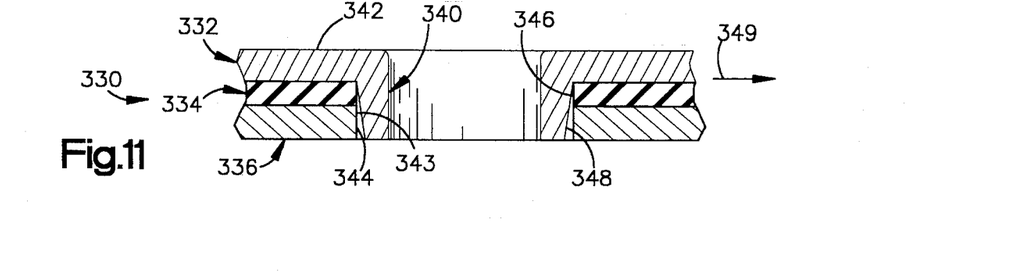
FIG. 11 is a view similar to FIG. 8 showing a portion of a vehicle safety apparatus constructed in accordance with an eighth embodiment of the present invention.

FIG. 11 illustrates a portion of a vehicle safety apparatus 330 which is constructed in accordance with an eighth embodiment of the present invention. The vehicle safety apparatus includes a retaining ring 332, an air bag 334, and a mounting plate 336. The retaining ring 332 and the mounting plate 336 are generally similar in configuration to the retaining ring 272 and the mounting plate 276 illustrated in FIG. 8. The retaining ring 332 has a circular flange 340 which projects axially from a radially extending body portion 342. An annular surface 343 defines a circular recess or opening 344 in the mounting plate 336. The flange 340 projects through an opening 346 in the air bag 334 and into the recess 344 in the mounting plate 336. An outer side surface 348 of the flange 340 is disposed closely adjacent to the surface 343 which defines the opening 344 in the mounting plate 336. Accordingly, the retaining ring 332 and the mounting plate 336 cooperate to block radial movement of the air bag 334 relative to the retaining ring and the mounting plate, in the direction of the arrow 349, upon inflation of the air bag. Again, any number and/or arrangement of sets of corresponding flanges 340, openings 346 and recesses 344 may be provided, as desired.

Figure 12:
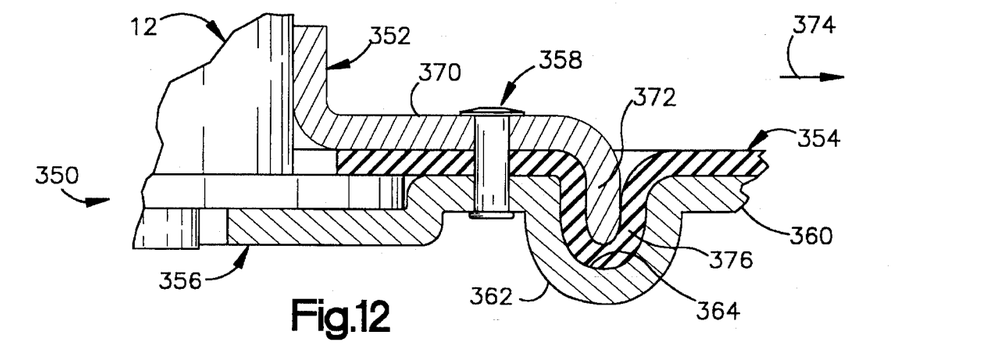
FIG. 12 is a view similar to FIG. 7 showing a portion of a vehicle safety apparatus constructed in accordance with a ninth embodiment of the present invention.

FIG. 12 illustrates a portion of a vehicle safety apparatus 350 which is constructed in accordance with a ninth embodiment of the present invention. The vehicle safety apparatus 350 includes an inflator 12, a retaining ring 352, an air bag 354, and a mounting plate 356. At least one fastener 358, which may be identical to the fastener 20 (FIG. 1), clamps the air bag 354 and the inflator 12 between the retaining ring 352 and the mounting plate 356.

The mounting plate 356 has a radially extending main body portion 360. A curved annular wall 362 extends generally axially from the main body portion 360 of the mounting plate 356. The wall 362 defines a recess 364 in the mounting plate 356. The wall 362 and the recess 364 extend 360° around the periphery of the inflator 12 at a location radially outward of the fastener 358.

The retaining ring 352 has a radially extending main body portion 370. An outer peripheral flange 372 of the retaining ring 352 extends from the main body portion 370 into the recess 364 in the mounting plate 356. The flange 372 extends 360° around the retaining ring 352 at a location radially outward of the fastener 358. The flange 372 forces a portion 376 of the material of the air bag 354 into the recess 364 in the mounting plate 356, thus resisting movement of the material of the air bag 354 in a radial direction, as indicated by the arrow 374, upon inflation of the air bag.

Figure 13A:
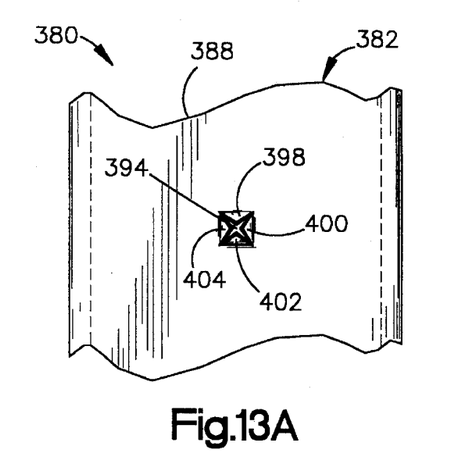
FIG. 13A is a plan view of a portion of a retaining ring forming part of a vehicle safety apparatus constructed in accordance with a tenth embodiment of the present invention and taken approximately along line 13A—13A of FIG. 13B.
Figure 13B:
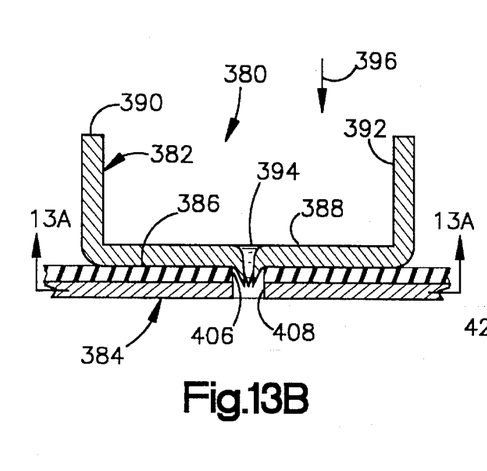
FIG. 13B is a sectional view showing the retaining ring of FIG. 13A in association with an air bag and a mounting plate.

FIGS. 13A and 13B illustrate a portion of a vehicle safety apparatus 380 which is constructed in accordance with a tenth embodiment of the present invention. The vehicle safety apparatus 380 includes a retaining ring 382 and a mounting plate 384 (FIG. 13B). An air bag 386 is clamped between the retaining ring 382 and the mounting plate 384. The retaining ring 382 is generally U-shaped in cross-sectional configuration having a planar bottom wall 388 and parallel side walls 390 and 392 which extend generally perpendicular to the bottom wall 388.

A star-shaped opening 394 is formed in the bottom wall 388 of the retaining ring 382. The opening 394 may be formed by punching through the bottom wall 388 in a direction as indicated by the arrow 396 (FIG. 13B). The displacement of material of the retaining ring 382 out of the plane of the bottom wall 388, to create the opening 394, forms a group of closely adjacent projections in the form of teeth 398, 400, 402 and 404 (FIG. 13A) disposed in a generally circular array about the opening. The teeth 398–404 have sharp points. The teeth 398–404 extend through an opening 406 in the air bag 386 and into a recess or opening 408 in the mounting plate 384. When the retaining ring 382 is clamped to the mounting plate 384, such as by fasteners 20 (FIG. 1), the teeth 398–404 resist movement of the air bag 386 from between the retaining ring and the mounting plate. Preferably, a series of groups of teeth, such as the group of teeth 398–404, is formed on the retaining ring 382. The groups are disposed in a circular array centered on the central axis (not shown) of the vehicle safety apparatus 380.

In the embodiment of the invention shown in FIGS. 13A–13B, the air bag 386 could be formed without the opening 406. In that case, the sharp points on the teeth 398–404 would extend into the material of the air bag 386 and force that material into the recess 408 of the mounting plate 384. The engagement of the sharp points on the teeth 398–404 would resist movement of the air bag 386. As with the other embodiments of the invention, any number of openings 394, openings 406, and recesses 408 could be used.

Figure 14A:
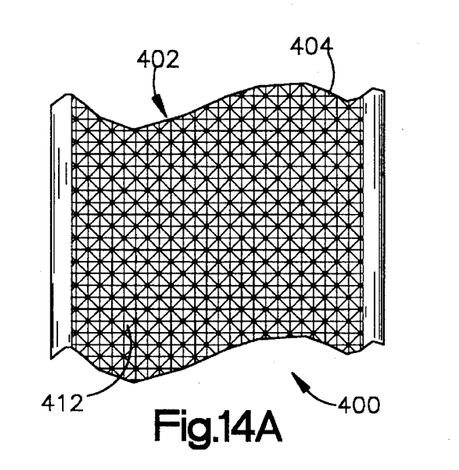
FIG. 14A is a plan view of a portion of a retaining ring forming part of a vehicle safety apparatus constructed in accordance with an eleventh embodiment of the present invention.
Figure 14B:
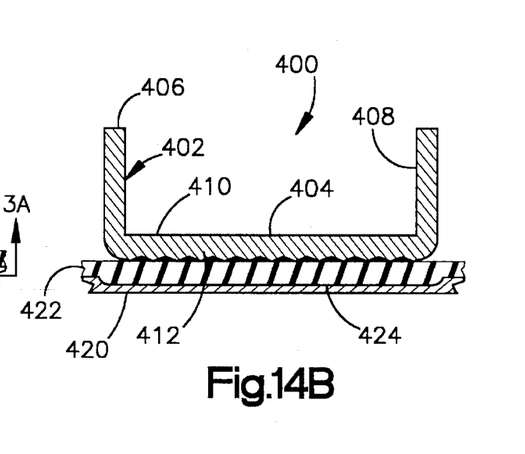
FIG. 14B is a sectional view showing the retaining ring of FIG. 14A in association with an air bag and a mounting plate.

FIGS. 14A and 14B illustrate a portion of a vehicle safety apparatus 400 which is constructed in accordance with an eleventh embodiment of the present invention. The vehicle safety apparatus 400 includes a retaining ring 402 which is generally U-shaped in cross-sectional configuration having a bottom wall 404 and parallel side walls 406 and 408 which extend generally perpendicular to the bottom wall. The bottom wall 404 has opposite inner and outer major side surfaces 410 and 412. The outer major side surface 412 has a knurled configuration including an alternating pattern of ridges and recesses.

The vehicle safety apparatus 400 also includes an inflator (not shown), a mounting plate 420, and an air bag 422. A portion of the air bag 422 is clamped between the retaining ring 402 and the mounting plate 420 (the parts are shown spaced slightly apart, for clarity, in FIG. 14B). The knurled surface 412 of the retaining ring 402 engages the air bag 422. A recess 424 is provided on the mounting plate 420, into which the material of the air bag 422 is forced by the ridges or projections on the retaining ring 402. The projections on the knurled surface 412 of the retaining ring 402 cooperate with the recess 424 in resisting movement of the air bag from its desired position between the retaining ring 402 and the mounting plate 420. The knurled surface could, alternatively, be formed on the mounting plate 420, with a corresponding recess on the retaining ring 402 if desired.

Figure 15A:
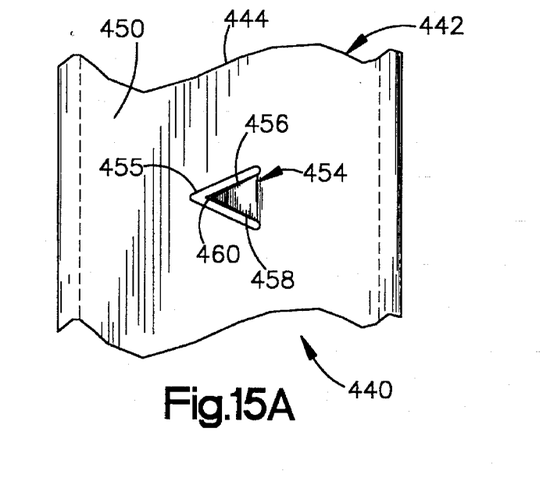
FIG. 15A is a plan view of a portion of a retaining ring forming part of a vehicle safety apparatus constructed in accordance with a twelfth embodiment of the present invention.
Figure 15B:
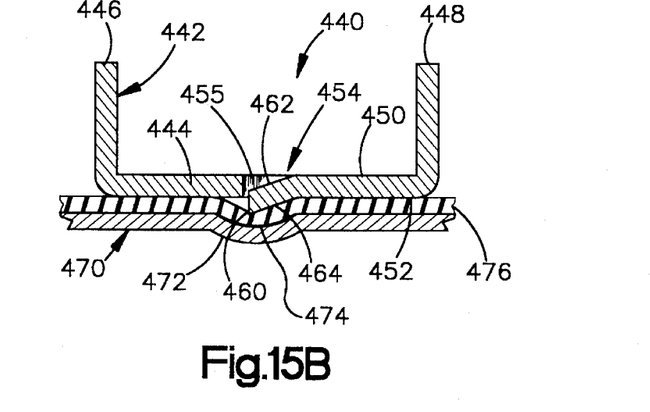
FIG. 15B is a sectional view showing the retaining ring of FIG. 15A in association with an air bag and a mounting plate.

FIGS. 15A and 15B illustrate a portion of a vehicle safety apparatus 440 which is constructed in accordance with a twelfth embodiment of the present invention. The vehicle safety apparatus 440 includes an inflator (not shown), a retaining ring 442 and a mounting plate 470. The retaining ring 442 is generally U-shaped in configuration and includes a radially extending bottom wall 444 and parallel axially extending side walls 446 and 448. The bottom wall 444 has an inner major side surface 450 and an outer major side surface 452.

A projection in the form of a tooth 454 defines an opening 455 in the retaining ring 442. The tooth 454 projects downwardly from the plane of the bottom wall 444 of the retaining ring 442 toward the mounting plate 470. The tooth 454 is generally triangular in configuration and has side walls 456 and 458 which converge at a sharp point 460. The tooth 454 has an upper major side surface 462 and a lower major side surface 464. The sharp point 460 of the tooth 454 extends in a predetermined direction toward the inflator (not shown), preferably toward the central axis of the inflator. For ease of manufacturing, additional material of the bottom wall 444 may be removed, as shown, to make the opening 455 larger, when viewed in plan, than the tooth 454.

The mounting plate 470 has a curved portion 472 defining a recess 474 in the mounting plate 470. The tooth 454 of the retaining ring 442 projects toward the recess 472 in the mounting plate 470. Although not illustrated, the tooth 454 could alternatively project into the recess 472 in the mounting plate 470.

A portion of an air bag 476 is clamped between the retaining ring 442 and the mounting plate 470. The tooth 454 of the retaining ring 442 forces a portion of the material of the air bag 476 into the recess 474 of the mounting plate 470. The sharp point 460 on the tooth 454 engages the material of the air bag 476. The engagement of the sharp tooth 454 with the material of the air bag 476 resists movement of the air bag 476 from between the retaining ring and the mounting plate upon inflation of the air bag.

Preferably, a plurality of teeth 454 are formed on the retaining ring 442. The plurality of teeth 454 can be arranged in any desired configuration, such as in a circular array centered on the central axis of the inflator (not shown). The teeth 454 can, alternatively, be formed on the mounting plate 470 and project toward or into one or more corresponding recesses in the retaining ring 442.

Figure 16:
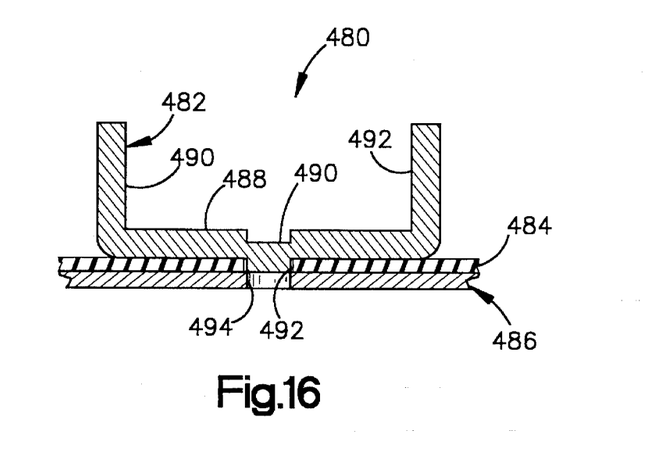
FIG. 16 is a view similar to FIG. 15B showing a portion of a vehicle safety apparatus in accordance with a thirteenth embodiment of the invention.

FIG. 16 illustrates a portion of a vehicle safety apparatus 480 which is constructed in accordance with a thirteenth embodiment of the present invention. The vehicle safety apparatus 480 includes an inflator (not shown) a retaining ring 482, an air bag 484, and a mounting plate 486. The retaining ring 482 is generally U-shaped in cross-sectional configuration having a bottom wall 488 and parallel side walls 490 and 492 which extend generally perpendicular to the bottom wall. A portion of the material of the bottom wall 488 is offset from the plane of the wall 488 to form a projection 490. The projection 490 extends into an opening 492 in the air bag 484 at a location adjacent to an opening 494 in the mounting plate 486. The projection 490 may alternatively, although not illustrated in FIG. 16, extend into the opening 494 in the mounting plate 486. The air bag 484 is clamped between the retaining ring 482 and the mounting plate 486. The projection 490 on the retaining ring 482 cooperates with the mounting plate 486 in resisting movement of the air bag 484 from between the retaining ring and the mounting plate upon inflation of the air bag.

Figure 17:
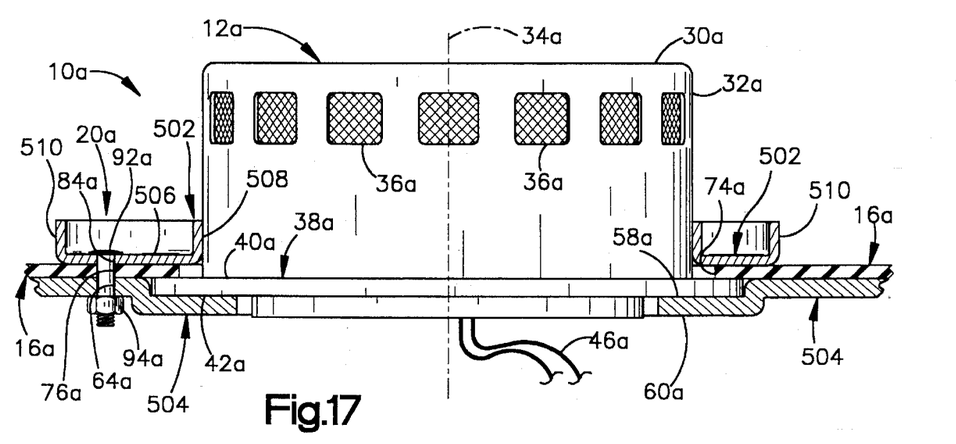
FIG. 17 is a view similar to FIG. 1 showing a portion of a vehicle safety apparatus in accordance with a fourteenth embodiment of the invention and taken approximately along line 17—17 of FIG. 18.
Figure 18:
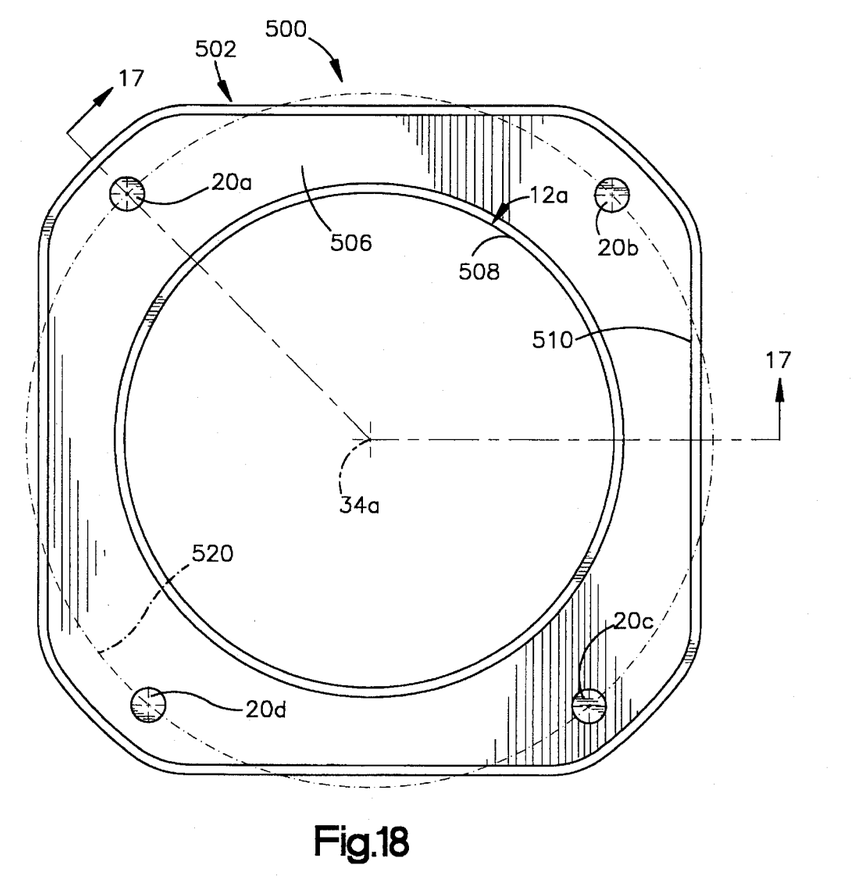
FIG. 18 is a plan view of the vehicle safety apparatus of FIG. 17.

FIGS. 17 and 18 illustrate a portion of a vehicle safety apparatus 500 which is constructed in accordance with a fourteenth embodiment of the present invention. The vehicle safety apparatus 500 is generally similar to the vehicle safety apparatus 10 of FIG. 1. Similar parts are given similar reference numerals with the suffix "a" added.

The vehicle safety apparatus 500 includes a retaining ring 502 which is generally U-shaped in cross-sectional configuration. The retaining ring 502 has a bottom wall 506 and parallel inner and outer side walls 508 and 510 which extend generally perpendicular to the bottom wall.

The retaining ring 502 is generally rectangular in overall configuration and circumscribes the inflator 12a. The inner side wall 508 of the retaining ring 502 defines a circular central opening of the retaining ring through which the body portion 30a of the inflator 12a extends. The inner side wall 508 is in abutting engagement with the outer surface 32a of the body portion 30a of the inflator 12a.

Four fasteners 20a, 20b, 20c and 20d, only one of which is visible in FIG. 17, project axially from the bottom wall 506 of the retaining ring 502. The fasteners 20a–20d are disposed in a circular array centered on the axis 34a. The fasteners 20a–20d lie on a common circle 520 (FIG. 18) centered on the axis 34a. The fasteners 20a and 20b are spaced apart from each other by 90° on the circle 520. In contrast, the fasteners 20c and 20d are spaced apart from each other by 80° on the circle 520. As a result, the fasteners 20b and 20c are spaced apart from each other by 95° on the circle 520, and the fasteners 20d and 20a are spaced apart from each other by 95° on the circle 520. Thus, the fasteners 20a–20d are disposed on the retaining ring 502 in a configuration which is not symmetrical or uniform around the axis 34a.

Each fastener 20a–20d (FIG. 17) includes a bolt 92a and a nut 94a. The bolts 92a extend axially through openings 84a (FIG. 17) in the retaining ring 502. It should be understood that the bolts 92a could be permanently joined, in a manner such as by welding, with the retaining ring 502. Also, other types of fasteners such as rivets could be used instead of the bolts 92 and the nuts 94.

The air bag 16a includes a plurality of openings 76a which are arranged on the air bag in a configuration identical to the configuration of the fasteners 20a–20d on the retaining ring 502. The mounting plate 504 includes a plurality of openings 64a arranged on the mounting plate in a configuration which is identical to the configuration of the fasteners 20a–20d on the retaining ring 502 and which is identical to the configuration of the openings 76a on the air bag 16a. The mounting plate 504 is planar in configuration. It should be understood, however, that the mounting plate 504 could have recesses such as the recesses 100–108 (FIG. 2) and the retaining ring 502 corresponding projections, or vice versa.

The bolts 92a extend axially through the aligned openings 84a, 76a, and 64a in the retaining ring 502, the air bag 16a, and the mounting plate 504, respectively. The nuts 94a are screwed on the bolts 92a. When the nuts 94a are screwed on the bolts 92a, the air bag 16a and the inflator 12a are clamped between the retaining ring 502 and the mounting plate 504.

The non-symmetrical configuration of the fasteners 20a–20d ensures that the retaining ring 502, the air bag 16a, and the mounting plate 504 can be assembled to each other in only one orientation. It should be understood that other spacings or configurations of the fasteners 20a–20d and the fastener openings could be used, so long as the spacing or configuration allows for only one properly assembled relative position of the air bag 16a, retaining ring 502, and mounting plate 504. For example, the fasteners 20a–20d need not lie on a common circle such as the circle 520, and the illustrated spacing between the fasteners need not be followed. The non-uniform or non-symmetrical fastener configuration may alternatively be provided on a circular retaining ring, such as the retaining ring 18 (FIGS. 1–3), rather than on a generally rectangular retaining ring as illustrated in FIGS. 17 and 18.

It should be understood that the above-described embodiments of the invention can be incorporated in various ways in a vehicle safety apparatus constructed in accordance with the invention. For example, projections such as the projection 100 (FIGS. 1–3) which are described herein as arcuate can extend for different selected arcuate lengths around an axis. Projections which are described herein as single elements can be incorporated at multiple locations on a mounting plate or on a retaining ring. Plural projections can be disposed in a circular array or in another pattern on a mounting plate or on a retaining ring. Recesses in a mounting plate or in a retaining ring can be formed as areas displaced from the surrounding material or can be formed as openings extending through the material. The recesses are preferably disposed radially outward of the central openings in the mounting plate and retaining ring, as illustrated, to resist movement of the air bag material upon inflation of the air bag.

From the above description of the invention, those skilled in the art will perceive improvements, changes and modifications in the invention. Such improvements, changes and modifications within the skill of the art are intended to be covered by the appended claims.

Having described the invention, we claim:

1. An apparatus for restraining an occupant of a vehicle in the event of a vehicle collision, said apparatus comprising:

an inflatable vehicle occupant restraint, said restraint having a folded and stored condition and an inflated condition, said restraint having an inflation fluid volume for receiving inflation fluid, said inflation fluid volume being defined by an interior surface of said restraint, and said restraint having an exterior occupant engaging surface;

a mounting member for mounting said inflatable restraint in a vehicle;

a retaining ring for engaging said interior surface of said restraint and for clamping said exterior surface of said restraint against said mounting member;

means for securing said retaining ring to said mounting member with said restraint clamped between said retaining ring and said mounting member;

surface means for defining a recess on a first one of said retaining ring and said mounting member, said surface means including a bottom wall of said first one of said retaining ring and said mounting member; and means for forcing a first portion of said restraint into said recess and into engagement with said bottom wall of said recess, said means for forcing comprising a projecting member on a second one of said retaining ring and said mounting member, said projecting member clamping said exterior surface of said restraint against said bottom wall of said first one of said retaining ring and said mounting member.

2. An apparatus as set forth in claim 1 wherein said surface means for defining a recess on said first one of said retaining ring and said mounting member comprises surfaces on said mounting member defining said recess in a major side surface of said mounting member which is presented toward said retaining ring, said mounting member including said bottom wall, said projecting member being connected with and projecting from said retaining ring in a direction toward said recess in said mounting member.

3. An apparatus as set forth in claim 1 wherein said surface means for defining a recess on said first one of said retaining ring and said mounting member comprises surfaces on said retaining ring defining said recess in a major side surface of said retaining ring which is presented toward said mounting member, said retaining ring including said bottom wall, and wherein said projecting member is connected with and projects from said mounting member in a direction toward said recess in said retaining ring.

4. An apparatus as set forth in claim 1 wherein said surface means for defining a recess on said first one of said retaining ring and said mounting member comprises surfaces defining a plurality of spaced apart concentric grooves, and wherein said projecting member comprises a plurality of spaced apart projecting portions of said second one of said retaining ring and said mounting member which are concentric with said grooves.

5. An apparatus as set forth in claim 1 wherein said surface means for defining a recess on one of said retaining ring and said mounting member comprises surfaces defining a circular groove extending around a central opening in said first one of said retaining ring and said mounting member, and wherein said projecting member extends completely around said central opening in said first one of said retaining ring and said mounting member.

6. An apparatus as set forth in claim 5 wherein said projecting member comprises an outer peripheral flange portion of said one of said retaining ring and said mounting member, said recess comprising a circular groove extending around said central opening in said first one of said retaining ring and said mounting member at a location radially outside said means for securing said retaining ring to said mounting member.

7. An apparatus as set forth in claim 1 wherein said surface means for defining a recess on said first one of said retaining ring and said mounting member comprises surfaces defining a plurality of circular recesses arranged on said first one of said retaining ring and said mounting member, and wherein said projecting member comprises a plurality of spaced apart circular projections, each one of said projections overlying a respective one of said plurality of circular recesses.

8. An apparatus as set forth in claim 7 wherein each one of said projections comprises a flange surrounding and defining an opening in said second one of said mounting member and said retaining ring, each one of said flanges projecting into a respective one of said plurality of recesses.

9. An apparatus as set forth in claim 1 wherein said projection comprises at least one tooth having a sharp point engageable with said restraint to block movement of said restraint in a predetermined direction.

10. An apparatus as set forth in claim 1 wherein said projecting member comprises a series of projecting ridges forming a knurled surface on said second one of said retaining ring and said mounting member.

11. An apparatus for restraining an occupant of a vehicle in the event of a vehicle collision, said apparatus comprising:

an inflatable vehicle occupant restraint;

a mounting member for mounting said restraint in the vehicle, said mounting member including surface means for defining a recess on said mounting member;

an inflation fluid source supported on said mounting member and having an axis; and a retaining ring clamping said restraint against said mounting member;

said retaining ring having a main body portion and at least one tooth on said main body portion, said tooth comprising a portion of the material of said main body portion which is bent out of said main body portion and which provides an opening in said main body portion, said tooth projecting from said main body portion in a direction toward said inflation fluid source, said tooth projecting toward said recess and engaging said restraint and forcing a portion of said restraint into said recess to resist movement of said restraint relative to said retaining ring and said mounting member.

12. An apparatus as set forth in claim 11 wherein said tooth is one of a plurality of teeth which are formed on said retaining ring.

13. An apparatus as set forth in claim 12 wherein said teeth are disposed in a circular array centered on said axis.

14. An apparatus as set forth in claim 11 wherein said tooth has a triangular configuration including side surfaces converging at a sharp point and extending in a direction toward said axis, said sharp point engaging said restraint.

15. An apparatus as set forth in claim 11 wherein said tooth is one of a group of teeth positioned around said opening in said main body portion of said retaining ring at a location radially outward of said inflation fluid source.

16. An apparatus as set forth in claim 15 including a plurality of said groups of teeth on said retaining ring spaced apart around said inflation fluid source.

17. An apparatus as set forth in claim 15 wherein said opening is star shaped.

18. An apparatus for restraining an occupant of a vehicle in the event of a vehicle collision, said apparatus comprising:

an inflatable vehicle occupant restraint;

a mounting member for mounting said restraint in a vehicle;

a retaining ring for clamping said restraint against said mounting member;

means for securing said retaining ring to said mounting member with said restraint clamped between said retaining ring and said mounting member; and a projecting member on a first one of said retaining ring and said mounting member, said projecting member comprising an alternating pattern of projecting ridges and recesses forming a knurled surface on said one of said retaining ring and said mounting member, said ridges on said knurled surface engaging said restraint and forcing a portion of said restraint into a recess on a second one of said retaining ring and said mounting member, said ridges on said knurled surface cooperating with said recess in resisting movement of said air bag from its desired position between said retaining ring and said mounting member.

19. An apparatus for restraining an occupant of a vehicle in the event of a vehicle collision, said apparatus comprising:

an inflatable vehicle occupant restraint, said restraint having a folded and stored condition and an inflated condition, said inflatable restraint having a plurality of first fastener openings arranged in a non-symmetrical configuration;

a mounting member for mounting said inflatable restraint in a vehicle, said mounting member having a plurality of second fastener openings arranged in a non-symmetrical configuration identical to the configuration of said first fastener openings;

a retaining ring for engaging said restraint and for clamping said inflatable restraint against said mounting member; and a plurality of fasteners arranged on said retaining ring in a non-symmetrical configuration identical to the configuration of said first and second fastener openings, said fasteners on said retaining ring projecting through said first fastener openings and through said second fastener openings to secure said retaining ring to said mounting member with said inflatable restraint clamped between said retaining ring and said mounting member.

20. An apparatus as set forth in claim 19 wherein said fasteners disposed in said non-symmetrical configuration have centers which are lie on a common circle.

21. An apparatus as set forth in claim 20 wherein said fasteners are spaced apart around the circumference of said circle at least two different angular intervals.

22. An apparatus as set forth in claim 21 wherein said plurality of fasteners includes four fasteners, first and second adjacent ones of said four fasteners being spaced apart at a 90° interval around said circle, and third and fourth adjacent ones of said four fasteners being spaced apart at an 80° interval around said circle.

* * * * *